(12) United States Patent
Karasawa

(10) Patent No.: US 6,839,603 B2
(45) Date of Patent: Jan. 4, 2005

(54) SEMICONDUCTOR MANUFACTURING SYSTEM AND CONTROL METHOD THEREOF

(75) Inventor: Wataru Karasawa, Tokyo (JP)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 10/275,647

(22) PCT Filed: May 8, 2001

(86) PCT No.: PCT/JP01/03846
§ 371 (c)(1),
(2), (4) Date: Nov. 8, 2002

(87) PCT Pub. No.: WO01/86704
PCT Pub. Date: Nov. 15, 2001

(65) Prior Publication Data
US 2003/0153995 A1 Aug. 14, 2003

(30) Foreign Application Priority Data
May 9, 2000 (JP) .................................. 2000-135985

(51) Int. Cl.[7] .............................................. G06F 19/00
(52) U.S. Cl. ..................................................... 700/101
(58) Field of Search ................................. 700/100–102, 700/99

(56) References Cited

U.S. PATENT DOCUMENTS

| | | | | |
|---|---|---|---|---|
| 4,887,218 A | * | 12/1989 | Natarajan | 700/102 |
| 5,399,531 A | * | 3/1995 | Wu | 700/112 |
| 5,586,021 A | * | 12/1996 | Fargher et al. | 700/100 |
| 5,751,580 A | * | 5/1998 | Chi | 700/100 |
| 5,787,000 A | * | 7/1998 | Lilly et al. | 700/95 |
| 5,975,740 A | * | 11/1999 | Lin et al. | 700/99 |
| 6,074,443 A | * | 6/2000 | Venkatesh et al. | 29/25.01 |
| 6,438,436 B1 | * | 8/2002 | Hohkibara et al. | 700/97 |
| 6,470,231 B1 | * | 10/2002 | Yang et al. | 700/121 |

FOREIGN PATENT DOCUMENTS

| | | |
|---|---|---|
| JP | 06203042 | 7/1994 |
| JP | 0914541 | 6/1997 |
| JP | 11184925 | 7/1999 |
| JP | 2000084801 | 3/2000 |
| JP | 2000099111 | 4/2000 |
| JP | 2000296442 | 10/2000 |

* cited by examiner

Primary Examiner—Paul Rodriguez
(74) Attorney, Agent, or Firm—Pillsbury Winthrop LLP

(57) ABSTRACT

In a semiconductor manufacturing system, operations of a plurality of processing apparatuses are controlled so as to efficiently manufacture semiconductor devices. The semiconductor manufacturing system having at least one processing apparatus for applying a process to semiconductor substrates. A memory part (5) stores priority-level data which indicates a priority level of the process to be applied to each of the semiconductor substrates on an individual semiconductor substrate basis. A control part (3, 7) controls the processing apparatus to apply the process to a newly supplied one of the semiconductor substrates by determining an order of processing the newly supplied one of the semiconductor substrates being supplied to the processing apparatus based on a comparison of new priority-level data with the priority-level data stored in the memory part with respect to the semiconductor substrates of which process has been scheduled, the new priority-level data being supplied in response to the newly supplied one of the semiconductor substrates being supplied to the processing apparatus.

26 Claims, 8 Drawing Sheets

SEMICONDUCTOR MANUFACTURING SYSTEM AND CONTROL METHOD THEREOF

This is the National Stage of International Application No. PCT/JP01103846, which was filed in the English language on May 8, 2001, and designated the U.S.

TECHNICAL FIELD

The present invention relates to a semiconductor integrated circuit manufacturing system and, more particularly, to a control method of a semiconductor integrated circuit manufacturing system and a computer-readable recording medium, which stores programs for realizing the control method of a semiconductor integrated circuit manufacturing system.

BACKGROUND ART

In a conventional semiconductor integrated circuit, a time spent on each manufacturing process is calculated manually. For example, a time when a wafer is supplied to a process chamber and a time when the process for the wafer is ended are recorded repeatedly, and a time taken for the process is roughly calculated based on the time of supply and the time of ending the process.

Additionally, since it is not considered in the conventional semiconductor integrated circuit manufacturing apparatus to apply a special treatment when the apparatus malfunctions in the middle of the process and stops for a certain period of time, there is a problem in that the manufacture of the semiconductor integrated circuits undesirably runs behind the schedule.

It should be noted that it is suggested to provide a backup apparatus in the manufacturing system so as to cope with a stop of the apparatus due to an unexpected trouble. However, in such a case, there is a problem that its cost performance is deteriorated because such a backup apparatus is expensive.

DISCLOSURE OF INVENTION

It is a general object of the present invention to provide an improved and useful semiconductor manufacturing system in which the above-mentioned problems are eliminated.

A more specific object of the present invention is to provide a semiconductor manufacturing system in which operations of a plurality of processing apparatuses are controlled so as to efficiently manufacture semiconductor devices.

Another object of the present invention is to provide a computer-readable medium which stores programs to control operations of a plurality of processing apparatuses so as to efficiently manufacture semiconductor devices.

In order to achieve the above-mentioned objects, there is provided according to the present invention a semiconductor manufacturing system having at least one processing apparatus for applying a process to semiconductor substrates, characterized in that: a memory part stores priority-level data which indicates a priority level of the process to be applied to each of the semiconductor substrates on an individual semiconductor substrate basis; and a control part controls the processing apparatus to apply the process to a newly supplied one of the semiconductor substrates by determining an order of processing the newly supplied one of the semiconductor substrates being supplied to the processing apparatus based on a comparison of new priority-level data with the priority-level data stored in the memory part with respect to the semiconductor substrates of which process has been scheduled, the new priority-level data being supplied in response to the newly supplied one of the semiconductor substrates being supplied to the processing apparatus. Accordingly, the process of the semiconductor substrates can be immediately started in an order determined according to the priority provided to each semiconductor substrate.

Additionally, the control part may calculate a time of ending the process being applied to the newly supplied one of the semiconductor substrates or a time of ending the process for all of the semiconductor substrates. Accordingly, measure for the time of ending the process can be provided to the user.

In the semiconductor manufacturing system according to the present invention, the memory part may store information regarding kinds of failure possibly occurring in the processing apparatus and a repair time needed for repairing the processing apparatus in response to each kind of failure; and when a failure occurs in the processing apparatuses, the control part may calculate the time of ending the process in accordance with the repair time read from the memory part in response to a kind of failure designated by a user. Accordingly, the time of ending the process can be calculated with high accuracy.

Additionally, the control part may calculate, based on a simulation of an operation of the processing apparatus, a time of supplying the newly supplied one of the semiconductor substrates to the processing apparatus in response to a time of ending the process designated by a user so as to end the process applied to the newly supplied one of the semiconductor substrates or all of the semiconductor substrates. Accordingly, the user can easily recognize the time to supply a new semiconductor substrate.

Additionally, a plurality of the processing apparatuses may be controlled by the control part; a monitoring part may monitors a condition of the process being performed by each of the processing apparatuses; and the control part may select one of the processing apparatuses which applies the process to the newly supplied one of the semiconductor substrates in response to the condition of the process being performed by each of the processing apparatuses. Accordingly, the semiconductor substrates can be processed by the processing parts which are sequentially selected based on the priority and the condition of the process performed by the processing part.

In the above-mentioned semiconductor manufacturing system, the monitoring part may monitor a remaining time for each of the processing apparatuses, the remaining time being a time until the process currently being applied is ended; and the control part may select one of the processing apparatuses which applies the process to the newly supplied one of the semiconductor substrates in accordance with the remaining time. Accordingly, a plurality of semiconductor substrates can be consecutively processed.

The monitoring part may monitor a continuous operating time for each of the processing apparatuses; and the control part may select one of the processing apparatuses which applies the process to the newly supplied one of the semiconductor substrates by referring to a failure occurring rate calculated for each of the processing apparatuses in accordance with the continuous operating time. Alternatively, the monitoring part may monitor a time remaining for performing a next periodic inspection for each of the processing apparatuses; and the control part may selects one of the processing apparatuses which applies the process to the newly supplied one of the semiconductor substrates in accordance with the time remaining for performing the next periodic inspection. Accordingly, an efficient process of the semiconductor substrate can be positively achieved.

Additionally, there is provided according to another aspect of the present invention a control method of a semiconductor manufacturing system having a processing apparatus which applies a process to semiconductor substrates, characterized by the steps of: storing priority-level data which indicates a priority level of the process to be applied to each of the semiconductor substrates on an individual semiconductor substrate basis; determining an order of processing a newly supplied one of the semiconductor substrates being supplied to the processing apparatus based on a comparison of new priority-level data with the priority-level data stored in the memory part with respect to the semiconductor substrates of which process has been scheduled, the new priority-level data being supplied in response to the newly supplied one of the semiconductor substrates being supplied to the processing apparatus; and causing the processing apparatus to apply the process to the newly supplied one of the semiconductor substrates.

Further, there is provided according to another aspect of the present invention a control method of a semiconductor manufacturing system having a processing apparatus which applies a process to semiconductor substrates, characterized by the steps of: storing priority-level data which indicates a priority level of the process to be applied to each of the semiconductor substrates on an individual semiconductor substrate basis; monitoring a condition of the process in each of the processing apparatuses; determining an order of processing a newly supplied one of the semiconductor substrates being supplied to the processing apparatus based on a comparison of new priority-level data with the priority-level data stored in the memory part with respect to the semiconductor substrates of which process has been scheduled, the new priority-level data being supplied in response to the newly supplied one of the semiconductor substrates being supplied to the processing apparatus; selecting one of the processing apparatuses which applies the process to the newly supplied one of the semiconductor substrates in accordance with the condition of the process and the order of processing; and causing the processing apparatus to apply the process to the newly supplied one of the semiconductor substrates.

Additionally, there is provided according to another aspect of the present invention a computer-readable recording medium storing program code for causing a computer to control a process applied to semiconductor substrates, characterized by: first program code means for storing priority-level data which indicates a priority level of the process to be applied to each of the semiconductor substrates on an individual semiconductor substrate basis; second program code means for comparing new priority-level data with the previous stored priority-level data with respect to the semi-conductor substrates of which process has been scheduled, the new priority-level data being supplied in response to the newly supplied one of the semiconductor substrates being supplied to a processing apparatus; third program code means for determining an order of processing a newly supplied one of the semiconductor substrates being supplied to the processing apparatus; and fourth program code means for causing the processing apparatus to apply the process to the newly supplied one of the semiconductor substrates.

In the computer-readable recording medium according to the present invention, fifth program code means may be provided for calculating a time of ending the process being applied to the newly supplied one of the semiconductor substrates or a time of ending the process for all of the semiconductor substrates. Additionally, the computer-readable recording medium according to the present invention may be provided with sixth program code means for storing information regarding kinds of failure possibly occurring in the processing apparatus and a repair time needed for repairing the processing apparatus in response to each of the kinds of failure; and seventh program code means, when a failure occurs in the processing apparatus, for calculating the time of ending the process in accordance with the repair time which is read in response to a kind of failure designated by a user.

Alternatively, the computer-readable recording medium according to the present invention may include fifth program code means for calculating, based on a simulation of an operation of the processing apparatus, a time of supplying the newly supplied one of the semiconductor substrates to the processing apparatus in response to a time of ending the process designated by a user so as to end the process applied to the newly supplied one of the semiconductor substrates or all of the semiconductor substrates.

Additionally, there is provided according to another aspect of the present invention a computer-readable recording medium storing program code for causing a computer to control a process applied to semiconductor substrates by a plurality of processing apparatuses, characterized by: first program code means for storing priority-level data which indicates a priority level of the process to be applied to each of the semiconductor substrates on an individual semiconductor substrate basis; second program code means for monitoring a condition of the process in each of the processing apparatuses; third program code means for comparing new priority-level data with the previously stored priority-level data with respect to the semiconductor substrates of which process has been scheduled, the new priority-level data being supplied in response to the newly supplied one of the semiconductor substrates to which the process is applied; fourth program code means for determining an order of processing the newly supplied one of the semiconductor substrates being supplied to the processing apparatuses; fifth program code means for selecting one of the processing apparatuses which applies the process to the newly supplied one of the semiconductor substrates in accordance with the condition of the process; and sixth program code means for causing the selected one of the processing apparatuses to apply the process to the newly supplied one of the semiconductor substrates.

The computer-readable recording medium according to the present invention may store seventh program code means for calculating a time of ending the process being applied to the newly supplied one of the semiconductor substrates or a time of ending the process for all of the semiconductor substrates. Additionally, the computer-readable recording medium according to the present invention may store eighth program code means for storing information regarding kinds of failure possibly occurring in the processing apparatus and a repair time needed for repairing the processing apparatus in response to each of the kinds of failure; and ninth program code means, when a failure occurs in the processing apparatus, for calculating the time of ending the process in accordance with the repair time which is read in response to a kind of failure designated by a user.

The computer-readable recording medium according to the present invention may store seventh program code means for calculating, based on a simulation of an operation of the processing apparatus, a time of supplying the newly supplied one of the semiconductor substrates to the processing apparatus in response to a time of ending the process designated by a user so as to end the process applied to the newly supplied one of the semiconductor substrates or all of the semiconductor substrates.

Alternatively, the computer-readable recording medium according to the present invention may store seventh program code means for monitoring a remaining time for each of the processing apparatuses, the remaining time being a time until the process currently being applied is ended; and eighth program code means for selecting one of the processing apparatuses which applies the process to the newly supplied one of the semiconductor substrates in accordance with the remaining time.

The computer-readable recording medium according to the present invention may store seventh program code means for monitoring a continuous operating time for each of the processing apparatuses; and eighth program code means for selecting one of the processing apparatuses which applies the process to the newly supplied one of the semiconductor substrates by referring to a failure occurring rate calculated for each of the processing apparatuses in accordance with the continuous operating time.

Additionally, the computer-readable recording medium may store seventh program code means for causing monitoring a time remaining for performing a next periodic inspection for each of the processing apparatuses; and eighth program code means for selecting one of the processing apparatuses which applies the process to the newly supplied one of the semiconductor substrates in accordance with the time remaining for performing the next periodic inspection.

Other objects, features and advantages of the present invention will become more apparent from the following detailed description when read in conjunction with the accompanying drawings.

BEST MODE FOR CARRYING OUT THE INVENTION

Figure 1:
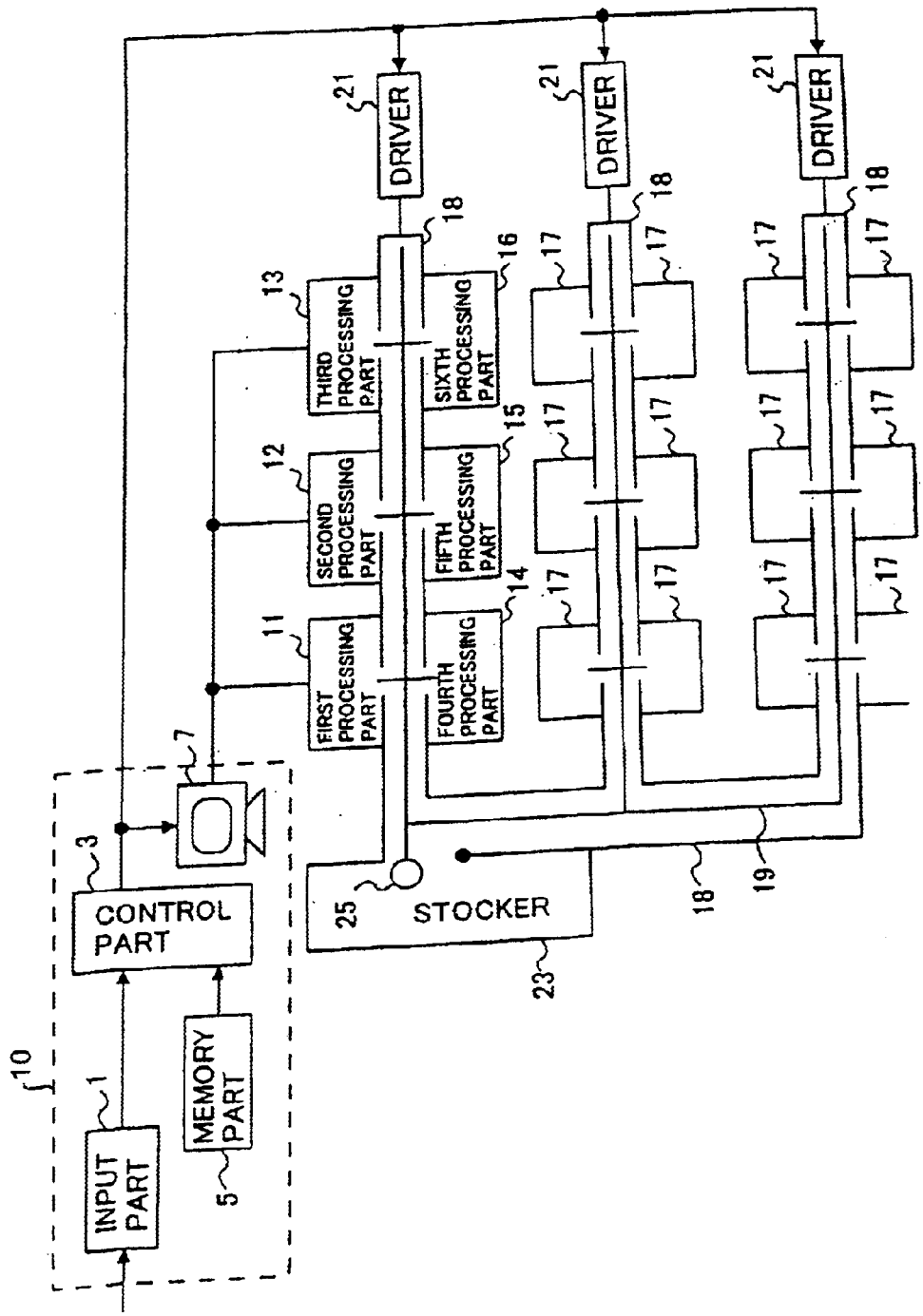
FIG. 1 is a block diagram of a structure of a semiconductor integrated circuit manufacturing system according to an embodiment of the present invention.

A description will now be given, with reference to the drawings, of an embodiment of the present invention. In the drawings, same parts are given the same reference numerals. Although the semiconductor integrated circuit manufacturing system which manufactures semiconductor integrated circuits on a wafer is explained in detail below, the present invention is applicable also to a system which manufactures a liquid-crystal display panel or the like.

FIG. 1 shows a structure of a semiconductor integrated circuit manufacturing system according to an embodiment of the present invention. As shown in FIG. 1, the semiconductor integrated circuit manufacturing system according to the present embodiment comprises a process control part 10, first to sixth processing parts 11–16, processing parts 17, a conveyance way 18, a conveyance orbit 19, drivers 21 and the stocker 23. The process control part 10 contains the input part 1, the first control part 3, the memory part 5, and the second control part 7.

The first control part 3 provided in the process control part 10 is connected to the input part 1. The memory part 5 is connected to the first control part 3. Additionally, the control part 7 is connected to the first control part 3.

On the other hand, in the above-mentioned semiconductor integrated circuit manufacturing system, the conveyance way 18, which has the conveyance orbit 19, is connected to a stocker 23. The first through sixth processing parts 11–16 and the processing parts 17 are arranged on the both sides of the conveyance way 18. Moreover, drivers 21 are provided to the conveyance way 18 in accordance with a drive capability required when a wafer 25 is conveyed along the conveyance orbit 19.

The first to sixth processing parts 11–16 and the processing parts 17 are connected to the second control part 7, respectively. Moreover, each of the drivers 21 is connected to the first control part 3. In addition, in FIG. 1, illustration of the connection relation between the second control part 7 and each of the fourth through sixth processing parts 14–16 and the processing parts 17 is omitted for the sake of convenience.

In the semiconductor integrated circuit manufacturing system having the above-mentioned structure, the first through sixth processing parts 11–16 and the processing part 17 perform the same process concurrently under the same condition. Alternatively, the same process may be concurrently performed under at least two or more different conditions, or two or more different processes may be concurrently performed, When the processing parts 11–17 provided in the semiconductor integrated circuit manufacturing system shown in FIG. 1 concurrently perform two or more different processes, a complete semiconductor integrated circuit manufacturing process can be executed by a single semiconductor manufacturing system. Such a system is called "mini-fab". It should be noted that the first through sixth processing parts 11–16 and the processing parts 17 are explained below as an example as what concurrently perform the same process under the same condition.

Additionally, in the above-mentioned semiconductor integrated circuit manufacturing system, each of the processing parts 11–17 may be directly connected to the first control part 3 by omitting the second control part 7 provided in the process control part 10. However, a description will be given below of a case in which the second control part 7 is provided in the process control part 10.

A description will now be given of an operation of a semiconductor integrated circuit manufacturing system having the above-mentioned structure. First, a kind with respect to a type of semiconductor integrated circuit formed on a wafer 25 and the priority of the process to be applied to the wafer are supplied to the input part 1 for each wafer 25 which is carried in the stocker 23. Here, the inputted kind and the priority are stored in the memory part 5 by the first control part 3 by being related to each other as shown in the following table 1.

TABLE 1

| Kind | Priority |
|------|----------|
| A | 3 |
| B | 3 |
| C | 3 |
| D | 2 |
| E | 3 |

In table 1, the "priority" is an index, which indicates the degree of the necessity of the process at an earlier stage to each wafer 25 carried in the stocker 23. The "priority" is represented in three levels of "1" to "3". That is, the "priority" is set as "1", which means an urgent mode, when the process to be applied to a new wafer carried in the stocker 23 needs to be performed first by suspending the present on-going process. The "priority" is set as "2", which means the express mode, when the process to be applied to a new wafer carried in the stocker 23 needs to be performed by top priority after completing the present on-going process. Furthermore, the "priority" is set as "3", which means the regular mode, when the process to be applied to a new wafer carried in the stocker 23 can be performed after an execution of the process which had been reserved previously.

Figure 2:
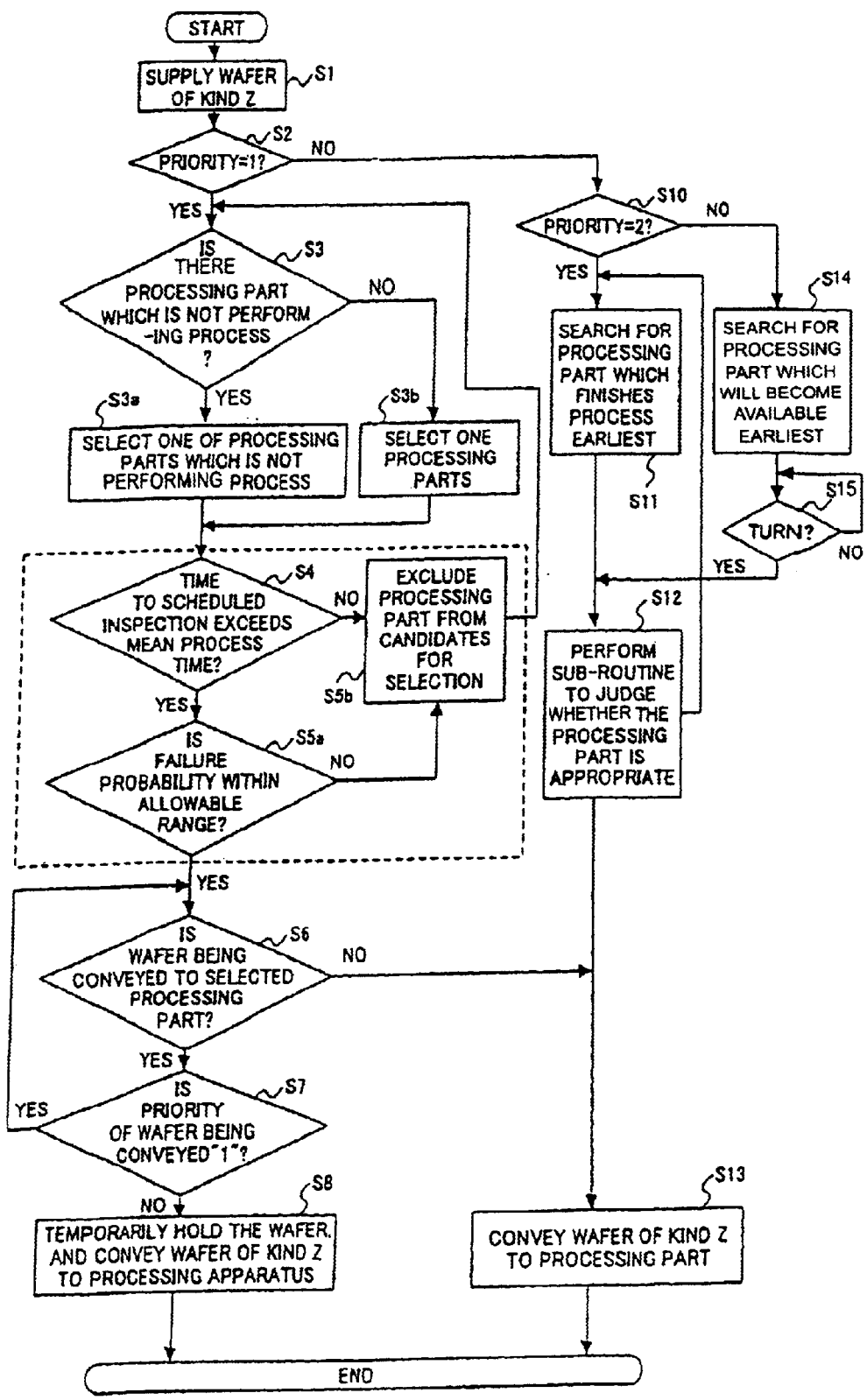
FIG. 2 is a first part of a flowchart of an operation of the semiconductor integrated circuit manufacture system shown in FIG. 1.

A description will now be given, with reference to a flowchart shown in FIG. 2, of an operation when a wafer 25, on which the semiconductor integrated circuit of kind Z is to be formed under the above-mentioned situation, is carried in the stocker 23.

First, the wafer 25 of kind Z is carried in the stocker 23 in step S1. A user inputs the priority with respect to the wafer 25 to the input part 1. Then, the first control part 3 judges, in step S2; whether the priority input by the user is 1. If it is judged that the priority is 1, the routine proceeds to step S3. When it is judged that the priority is not 1, the routine proceeds to step S10. It should be noted that the priority input by the user is added to the table 1, as shown in the following table 2, and stored in the memory part 5 by the first control part 3.

TABLE 2

| kind | Priority |
|------|----------|
| A | 3 |
| B | 3 |
| C | 3 |
| D | 2 |
| E | 3 |
| Z | 1 (2, 3) |

In step S3, the first control part 3 judges the existence of the processing parts 11–17 which are not performing the process, when the priority "1" is input to the input part 1 by the user. Since information which shows a status of an operation of each of the processing parts 11–17 is supplied to the second control part 7 at any time, and is stored for a predetermined time, the first control part 3 makes judgment in step S3 by referring to the information stored in the second control part 7.

Additionally, as shown in the following table 3, the information which shows the status of an operation of each of the processing parts 11–17 is temporarily stored in the second control part 7 by being related to the respective one of the processing parts, and is stored in the memory part 5 by the first control part 3 if needed. It should be noted that only the information, which indicates the status of the operation with respect to each of the first through sixth processing parts 11–16, is shown in table 3 for the sake of convenience.

TABLE 3

| Proc. part No. | Status of process | Remaining time | Time after repair | Time to next check | Failure probability |
|---|---|---|---|---|---|
| First | In process | 30 sec | 100 hrs | 30 hrs | 20% |
| Second | In process | 60 sec | 250 hrs | 20 hrs | 50% |
| Third | Failure | 2 hrs | 501 hrs | 20 hrs | 100% |
| Fourth | Periodic check | 2 hrs | 100 hrs | 0 hr | 20% |
| Fifth | In process | 50 sec | 400 hrs | 10 hrs | 80% |
| Sixth | In process | 30 sec | 250 hrs | 5 hrs | 50% |

In the above table 3, the "remaining time" means a time needed to complete the present on-going process. With respect to a processing part which is under failure or being subjected to a periodic inspection or check, the "remaining time" means time until the processing part can resume the process processing about the processing part under failure and scheduled inspection. Additionally, the "time after repair" means a lapsed time after returning from the last failure in the past. The "time to next check" means a time to a next scheduled inspection defined according to the scheduled inspection interval defined beforehand.

Additionally, the "failure probability" is calculated by the formula of ("time after repair"/MTBF)×100(%). Here, "MTBF" means the mean time between failure of the processing parts 11–17. For example, supposing this value is 500 hours, as shown in table 3, failure probability with respect to each of the first through sixth processing parts 11–16 is set to 20%, 50%, 100% (when computed or more with 100, referred to as 100), 20%, 80% and 50%, respectively. Therefore, the higher the failure probability is, the more the failure occurs easily.

Figure 3:
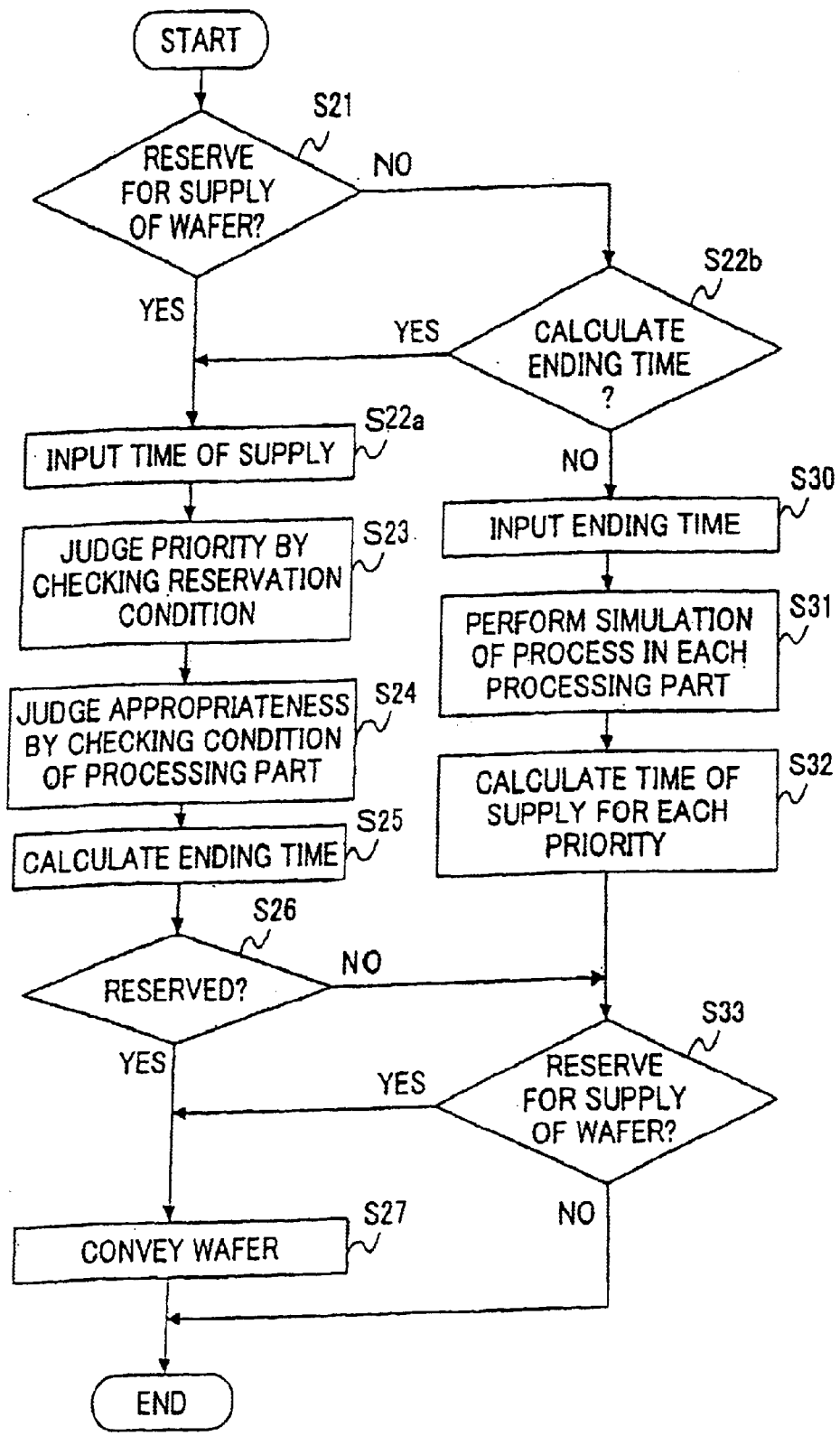
FIG. 3 is a second part of a flow chart of the operation of the semiconductor integrated circuit manufacturing system shown in FIG. 1.

In step S3, when the first control part 3 judges, based on the information shown in FIG. 3, that there is a processing part which is not performing a process, the routine proceeds to step S3a. In step S3a, one of the processing parts which are not performing is selected, and the routine proceeds to Step S4. In addition, when there are two or more processing parts which are not performing a process, the processing part nearest to the stocker 23 is selected, i.e., the processing part with the shortest conveyance time with respect to the stocker 23 is selected. On the other hand, when the first control part 3 judges, in step S3, that there is no processing part which is not performing a process, the routine proceeds to step S3b. In step S3b, one of the processing parts is selected, and the routine proceeds to Step S4. It should be noted that in the selection in the above-mentioned step S3a and step S3b, the first control part 3 may select a processing part having the minimum failure probability by referring to the failure probability indicated in the table 3.

Next, the first control part judges, in step S4, whether the time to the next scheduled inspection with respect to the selected processing part is longer than mean processing time. The "mean processing time" is a value which is obtained by dividing an accumulated processing time of the processing part by a number of wafers processed within the accumulated process time. That is, the "mean processing time" means the mean time of the processing time needed for processing a single wafer. Additionally, the "mean processing time" is calculated by the second control part 7 for each processing parts 11–17 whenever the wafer 25 is processed by the processing parts, and is retained in relation to the information of the table 3. If the control part 3 judges that the time to the next scheduled inspection of the selected processing part is longer than the mean processing time, the routine proceeds to step S5a. On the other hand, when the time to the next scheduled inspection is judged to be shorter than the mean processing time, the routine proceeds to step S5b.

Next, the first control part 3 judges, in step S5a, whether the failure probability of the selected processing part is within an allowable range based on the information shown in the above-mentioned table 3. If the value of, for example, 90% is set up beforehand as a degree of permission, of the failure probability and if the failure probability calculated with respect to each of the processing parts exceeds 90%, the routine proceeds to step S5b. In step S5a, the selected processing part is removed from a selection candidate, and the routine returns to Step S3. On the other hand when the failure probability does not exceed 90%, the routine proceeds to step S6. It should be noted that a warning may be issued, in step S6, based on a warning threshold value which is set together with the above-mentioned allowable range. That is, when a value of, for example, 70% is set to the warning threshold value, a warning may be issued so as to notify a user of a high probability of failure in a processing part having a failure probability of more than 70%. This may be effective with respect to a prediction of failure. Additionally, the processing parts having the failure, probability exceeding the warning threshold value may be excluded from the candidates of selection.

Next, the first control part 3 judges, in step S6, whether there is any wafer under conveyance to the selected processing part based on the information which shows the processing condition currently retained in the second control part 7. If it is judged that there is a wafer under conveyance, the routine proceeds to step S7, otherwise, the routine proceeds to step S13. Here, in step S13, the wafer of kind Z is conveyed to the selected processing part.

In step S7, the first control part 3 judges whether or not the priority of the wafer under conveyance is "1". If it is judged that the priority is "1", the routine returns to Step S6. Accordingly, in this case, after conveying the wafer having the priority of "1" to the processing part, a new wafer having the priority of "1" is subsequently conveyed to the same processing part. On the other hand, if the first control part 3 judges, in step S7, that the priority of the wafer under conveyance is not "1", the routine proceeds to step S8.

In step S8, the first control part 3 interrupts the process performed by the selected processing part, and the driver 21 which received the instruction from the first control part 3 moves the wafer in the selected processing part to the stocker 23. Then, the wafer of kind Z having the priority of "1" is conveyed to the selected processing part instead of the wafer moved to the stocker 23. It should be noted that the wafer temporarily moved to the stocker 23 is processed at a top priority by any one of the processing parts after the process applied to the wafer of kind Z is completed.

If a notification is sent to the second control part 7 of failure occurring in the processing part which has been selected as a processing part to which the wafer is conveyed while the wafer of kind Z is conveyed, the first control part 3 stops the wafer under conveyance, or returns the wafer to the stocker 23. In such a case, the routine returns to step S3. It should be noted that the above-mentioned operation when failure occurs during the conveyance is similarly performed in the process described below.

The above is the operation when the priority of the wafer of kind Z is set to "1". With reference to the priority shown in the above-mentioned table 2, the wafers of kinds D, A, B, C, and E are supplied to the elected one of the processing parts 11–17 one by one.

On the other hand, when it is judged, in the above-mentioned step S2, that the priority of the wafer of kind Z is not "1", the routine proceeds to step S10. It is judged, in step S10, by the first control part 3 whether the priority is "2". If it is judged that priority is "2", the routine proceeds to step S11. If it is judged that the priority is not "2", the routine proceeds to Step S14.

In step S11, the first control part 3 searches for the processing parts 11–17 of which process will finish earliest based on the information regarding the "remaining time" shown in the above-mentioned table 3. Then, in step S12, the first control part 3 judges appropriateness of the searched processing part. That is, in step S12, an operation of step S4 through step S5a, which is encircled by doted lines in FIG. 2 is performed. Thereafter, if it is judged that the processing part is not appropriate, the processing part is excluded form the candidates of selection, and the routine returns to step S11. On the other hand, if it is judged that the processing part is appropriate, the routine proceeds to step S13 so as to convey the wafer of kind Z to the selected processing part.

As mentioned above, when priority of the wafer of kind Z is set to "2", the wafer is supplied to the processing part selected in the manner mentioned above after the previously reserved wafer of kind D having the same priority level is supplied to one of the processing parts. It should be noted that, in such as case, the process of the wafer of kind Z is performed by waiting completion of the on-going process performed by the selected processing part. Additionally, in this case, the wafers of kinds A, B, C, and E are supplied to the processing parts 11–17 one by one.

On the other hand, if the priority of the wafer of kind Z is set to "3", a process of step S14 and the subsequent steps is performed. That is, in step S14, the first control part 3 carries out the simulation of the processing situation in the future by referring to the "remaining time" shown in table 3 regarding the processes which have already been performed so as to calculate the schedule time at which the process of the wafer of kind Z can be started. Then, the first control part 3 searches for the processing part, which can become available earlier than the calculated scheduled time.

A description will now be given, of a method of calculating the above-mentioned scheduled time. First, the first control part 3 holds beforehand as parameters a time needed to convey the wafer between the stocker 23 and each processing part 11–17, a time Tg needed for setting or resetting the wafer to each processing part 11–17 and a processing time Tt corresponding to the contents of the process performed in each processing part 11–17. It should be noted that the time needed to convey the wafer from the stocker 23 to each processing part 11–16 is represented by a time Ta, Tb, Tc, Td, Te and Tf, respectively.

In order to start the process in the first processing part 11 shown in FIG. 1, the time (Ta+Tg) is needed. Similarly, in order to start the process in the second to sixth processing parts 12–16, the time (Tb+Tg), (Tc+Tg), (Td+Tg), (Te+Tg) and (Tf+Tg) are needed, respectively. For example, an ending time at which the wafer 25 returns to the stocker 23 after the wafer 25 is immediately conveyed to and processed in the first processing part 11 is calculated based on the going and returning time to the processing part, the time required for setting and resetting the wafer and the time required for processing the wafer.

In the above-mentioned method, the ending time of the process for each wafer of which process was reserved is calculated, and the processing parts are determined sequentially in accordance with the calculated ending time, and the scheduled time to start the process of the wafer of kind Z is calculated by a simulation. It should be noted that when the priority of the wafer of kind Z is set as "3", the wafer of kind D having the priority of "2" is first supplied to one of the processing parts 11–17. Thereafter, the wafers having the same priority "3" are supplied to the processing parts 11–17 in an order of reservation. That is, the wafers of kinds A, B, C, E and Z are sequentially supplied to the processing parts 11–17.

Thereafter, in step S15 the first control part 3 judges whether the turn that the wafer of kind Z is processed has come. If it is judged that turn has come, the routine proceeds to step S12.

It should be noted that the "remaining time" in table 3 means a period to a time when the process can be resumed after the processing part is repaired. A time required for performing the scheduled inspection is stored in the first control part 3 or the second control part 7, and the first control part 3 or the second control part 7 calculates the time required for performing the scheduled inspection by counting time from a time when the scheduled inspection is started.

Additionally, as mentioned above, the "remaining time" in the table 3 with respect to the processing part under failure means a time until a time when the process is resumed after being repaired. The repair time corresponding to each cause of failure is stored in the first control part 3 or the second control part 7 together with a failure number as shown in the following table 4.

TABLE 4

| Failure No. | Cause of failure | Repair time |
| --- | --- | --- |
| 1 | Conveyance system failure (parameter abnormality) | 10 minutes |
| 2 | Lamp failure | 30 minutes |
| 3 | Conveyance system failure | 2 hours |
| 4 | Vacuum failure | 5 hours |
| . | . | . |
| . | . | . |
| . | . | . |

It should be noted that the "conveyance system failure (parameter abnormality)" corresponding to the failure number 1 indicates a case in which an abnormality is detected in the conveyance system including the conveyance orbit 19 and the driver 21 when, for example, a size different from an actual size of the wafer to be conveyed is mistakenly input as a parameter by the user and the conveyance system is stopped. Additionally, the "lamp failure" corresponding to the failure number 2 indicates a case in which a lamp, which is a consumable part, is blown off and replacement is needed. Further, the "conveyance system failure" corresponding to the failure number 3 indicates a case in which a motor used in the conveyance system fails and replacement is needed. Further, the "vacuum failure" corresponding to the failure number 4 indicates a case in which a desired vacuum cannot be formed in a chamber provided in the process part due to an abnormality in a vacuum pump and replacement of the vacuum pump is needed.

When failure occurs in a one of the processing parts 11–17, the second control part 7 notifies a user of failure generating in the processing part through a monitor display etc. At this time, the user inputs the failure number corresponding to the cause of the generated failure to the input part 1. Accordingly, a repair time corresponding to the cause of the failure is read from the Table 4, and the "remaining time" is calculated by counting the repair time by the first control part 3 or the second control part 7.

Additionally, when judging whether or not the selected processing part is proper, the first control part 3 may further consider the reliability of each of the processing parts 11–17. That is, a reliance minimum coefficient is previously obtained as a performance statistics value with respect to each of the processing parts 11–17, and a time obtained by multiplying the above-mentioned mean time between failure by the reliability lower-limit coefficient is set as a minimum reliability at the above-mentioned reliability level. The reliance minimum coefficient means a time which can guarantee a normal operation of the processing part at least at the reliability level.

More specifically, supposing the mean failure interval time of the selected processing part is 200 hours and the reliance minimum coefficient corresponding to a reliance level of 90% is 0.6, 120 hours obtained by calculating 200×0.6 correspond to a reliance minimum of 90% with respect to the mean failure interval time (200 hours). If it is judged by the first control part 3 that the thus-obtained reliance minimum is below a minimum value, the processing part may be excluded from the candidates of selection.

Additionally, the semiconductor integrated circuit manufacturing system shown in FIG. 1 may have a function to calculate a time of ending the whole or a predetermined process in accordance with a supply reservation time input by a user to the input part 1. Further, the semiconductor integrated circuit manufacturing system may have a function to calculate and display a time to supply a predetermined wafer in accordance with a desired ending time input by a user to the input part 1, and accept a reservation made by the user who made a determination by observing the display.

A description will now be given, with reference to a flowchart of FIG. 3, of an operation which realizes the above-mentioned function of the semiconductor integrated circuit manufacturing system shown in FIG. 1. First, in step S21, the user judges whether or not a process of the wafer by supplying to a processing part is to be reserved. When the reservation is to be made, the routine proceeds to step S22a. On the other hand, when no reservation is to be made, the routine proceeds to step S22b. Then, the user judges, in step S22b, whether or not a time of ending is to be calculated. When the time of ending is to be calculated, the routine proceeds to step S22a. When the time of ending is not to be calculated end time, the routine proceeds to step S30.

In step S22a, the user inputs to the input part 1 a desired time to supply a wafer. Then, in step S23, the priority regarding the reserved wafer, which is shown in table 1, is referred to by the first control part 3, and an order of processing of the newly supplied wafer is determined. It should be noted that in the determined order, a wafer having a higher priority is put in a higher position, and wafers having the same priority are put in a reserved order.

In step S24, a simulation of the process to be applied to the reserved wafer is performed while the first control part 3 checks the processing situation of each of the processing parts 11–17 and judging the appropriateness. Specifically, the simulation of the process is carried out in the order determined in step S23. The process of step S4, step S5a and step S5b shown in FIG. 2 is performed in the simulation. That is, after the process of each wafer is finished in the simulation, each information which shows the processing situation shown in the above-mentioned table 3 is computed virtually, and the process of step S4, step S5a and S5b shown in FIG. 2 is performed. As mentioned above, the first control part 3 judges the appropriateness of each processing part on the basis of the information computed virtually, and determines the processing part to which the wafer to be processed next is supplied.

In step S25, in the simulation, the wafer newly made as an object for reservation is supplied to one of the processing parts, which will become available at a time close to the above-mentioned desired time to supply the wafer, and the time of ending the process applied to the wafer is calculated. At the same time, a time at which the process applied to all of the reserved wafers is calculated. It should be noted that measure for the end time of the process can be provided to the user by displaying the calculated time on a display provided in the second control part.

Next, in step S26, the first control part 3 judges whether the new wafer is reserved. If it is judged that it is reserved, the routine proceeds to step S27. If it is judged that it is not reserved, the routine proceeds to step S33 mentioned later. In step S27, the reserved wafer is sequentially conveyed to the processing parts in the order determined according to the priority, and the desired process is performed.

On the other hand, in step S30, a desired time of ending the process applied to the wafer to be newly reserved or the time of ending the process applied to all wafers is supplied to the input part 1 by the user. Then, in step S31, the simulation of the process in each processing part is carried out by the first control part 3 as mentioned above, and the time at which the newly reserved wafer is supplied by reverse calculating based on the desired end time. It should be noted that the time of supply is calculated based on each priority level of the wafer to be newly reserved.

The user is notified of the thus-calculated time to supply by being displayed on a monitor provided in the second control part 7. Accordingly, the user determines in step S33 whether to reserve the supply of the new wafer. If the reservation is to be made, the routine proceeds to step S27 after completing the reservation. If the reservation is tot needed, the routine is ended.

According to the above-mentioned operation of the semiconductor integrated circuit manufacturing system shown in FIG. 1, the best process according to the situation of each of the processing parts 11–17 is performed for every wafer, thereby increasing the manufacturing efficiency of a semiconductor integrated circuit. Additionally, since the simulation of wafer processing is performed as mentioned above according to a user's needs, manufacture of semiconductor integrated circuits can be performed schematically.

Figure 4:
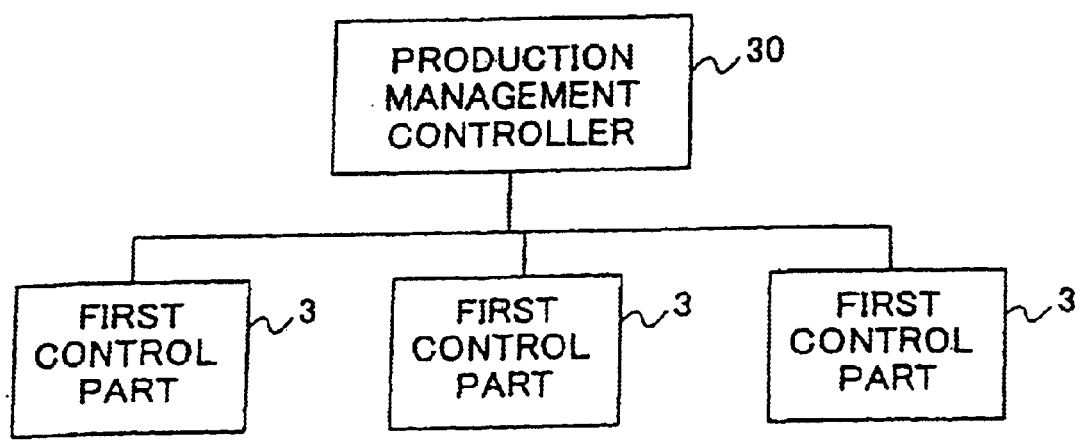
FIG. 4 is a block diagram of a basic structure of a production control system provided with a plurality of semiconductor integrated circuit manufacturing systems shown in FIG. 1.

On the other hand, it is useful to construct a production management system having a plurality of semiconductor integrated circuit manufacturing systems connected in parallel to an upper production management controller 30 as shown in FIG. 4. That is, as shown in FIG. 4, in the production management system, the first control part 3 provided in each semiconductor integrated circuit manufacturing system is connected to the production management controller 30, respectively. It should be noted that, in FIG. 4, the illustration regarding other portions of the semiconductor integrated circuit manufacture system shown in FIG. 1 is omitted.

Additionally, the plurality of the above-mentioned semiconductor integrated circuit manufacturing systems may be perform different processes from each other. Further, a plurality of semiconductor integrated circuit manufacturing systems may constitute a plurality of groups, which perform different processes. That is, for example, in a case in which the first through sixth processing parts 11–16 shown in FIG. 1 are etchers which perform etching processes, the first processing part 11 may be set as a first group in which a kind of gas and a temperature and a pressure of the gas are set in a first condition; the second processing part 12 and the third processing part 13 are set as a second group in which a second condition is set; and the fourth through sixth processing parts 14–16 are set as a third group in which a third condition is set. In this production management system, information is supplied to the first control part 3 of each of the processing parts through the production management controller 30, which manages the plurality of semiconductor integrated circuit manufacturing systems.

Figure 5:
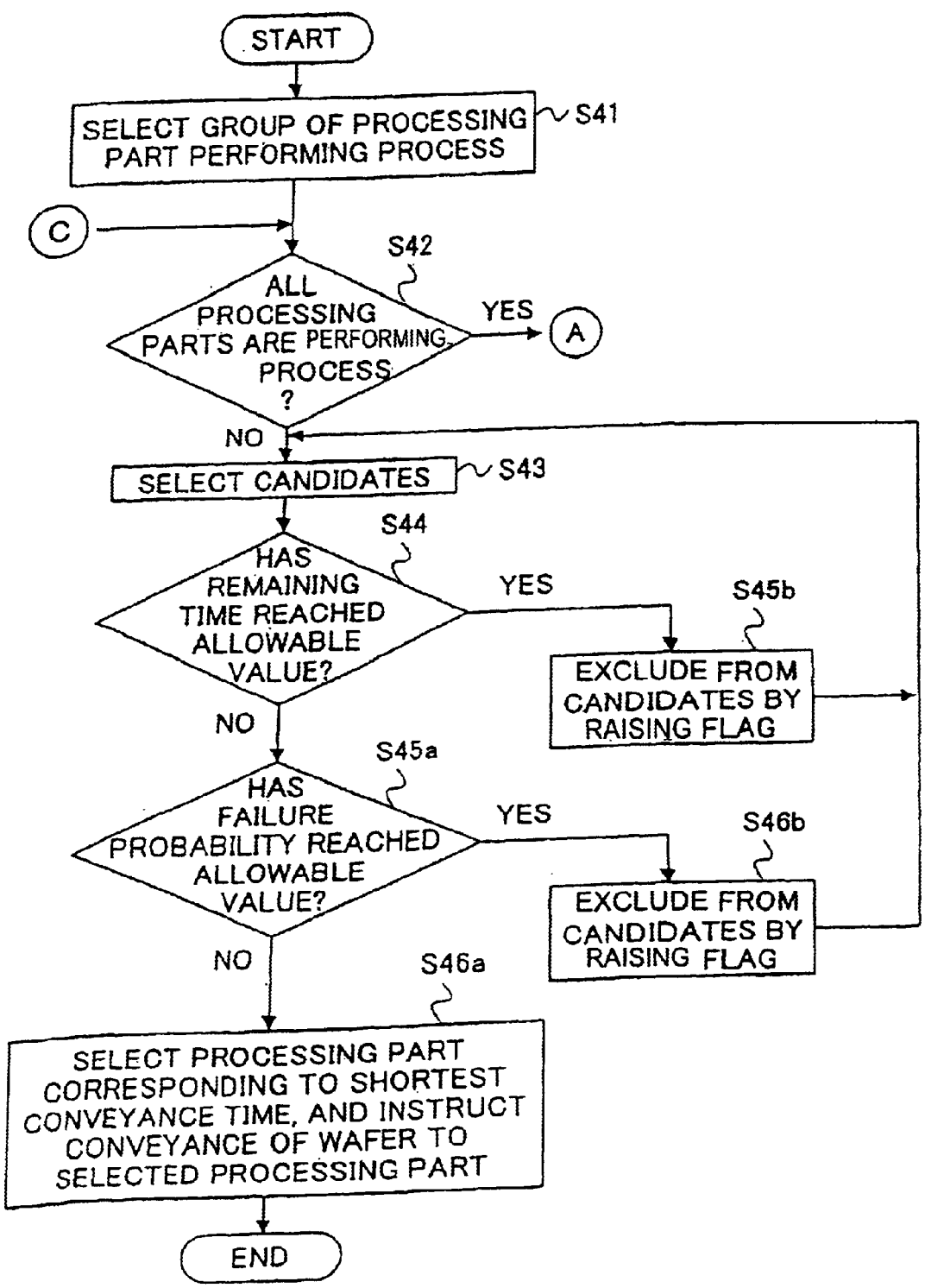
FIG. 5 is a first part of a flowchart of an operation of the production control system shown in FIG. 4.

A description will now be given, with reference to flow charts of FIGS. 5 to 7, of an operation of such a production management system. First, the production management controller 30 retains data indicating the contents of a process performed in relation to each of the semiconductor integrated circuit manufacturing systems. Then, when an instruction of the contents of the process to be performed is sent by the user, the production management controller 30 selects one of the semiconductor integrated circuit manufacturing systems which can realize the process. Thus, the production management controller 30 supplies the data which represents the contents of the process to the first control part 3 provided in the selected one of the semiconductor integrated circuit manufacturing systems. It should be noted that the data which represents the contents of such process may be directly supplied to the input part 1 of the selected one of the semiconductor integrated circuit manufacture systems according to the judgment by the user.

In step S41, the first control part 3 selects one of the above-mentioned groups set to perform the designated process. Then, in step S42, The first control part 3 judges whether or not all the processing parts contained in the selected one of the groups are performing processes. If it is judged that all the processing parts contained in the selected one of the groups are performing the process, the routine proceeds to a part A in the flowchart of FIG. 5. On the other hand, if it is judged that at least one processing part contained in the selected group is not performing the process, the routine proceeds to step S43. It should be noted that a process of the part A part and a process of a part C shown in FIG. 5 will be described later.

In step S43, the first control part 3 selects, as candidates for selection, all the processing parts that are not under processing from among the processing parts which can be selected. Then, in step S44, the first control part 3 accesses the second control part 7 and refers to a "time to the next scheduled inspection" for each processing part set as a candidate for selection, and judges whether or not the "time to the next scheduled inspection" has reached an allowable value. It should be noted that the judgment whether or not the "time to the next scheduled inspection" has reached the allowable value may be made at a time when the process applied to the newly supplied wafer is ended.

Then, with respect to the processing parts of which "time to the next scheduled inspection" is judged to have reached the allowable value, the routine proceeds to step S45b. On the other hand, the routine proceeds to step S45a with respect to the processing parts of which "time to the next scheduled inspection" is judged not to have reached the allowable value. In step S45b, a flag contained in the first control part 3 or the second control part 7 is raised so as to exclude the processing part from the candidates for selection, and the routine returns to step S43.

On the other hand, in step S45a, the first control part 3 accesses the second control part 7 and refers to a "failure probability" for each processing part set as a candidate for selection, and judges whether or not the "failure probability" has reached an allowable value. It should be noted that the judgment whether or not the "failure probability" has reached the allowable value may be made at a time when the process applied to the newly supplied wafer is ended.

Then, with respect to the processing parts of which "failure probability" is judged to have reached the allowable value, the routine proceeds to step S46b. On the other hand, the routine proceeds to step S46a with respect to the processing parts of which "failure probability" is judged not to have reached the allowable value. In step S46b, a flag contained in the first control part 3 or the second control part 7 is raised so as to exclude the processing part from the candidates for selection, and the routine returns to step S43.

In step S46a, the first control part 3 selects one of the processing parts, which are the candidates for selection, having a shortest conveyance time, and sends an instruction to the driver 21 and the second control part 7 to convey the wafer to the selected one of the processing parts and process the wafer in the selected one of the processing parts.

Figure 6:
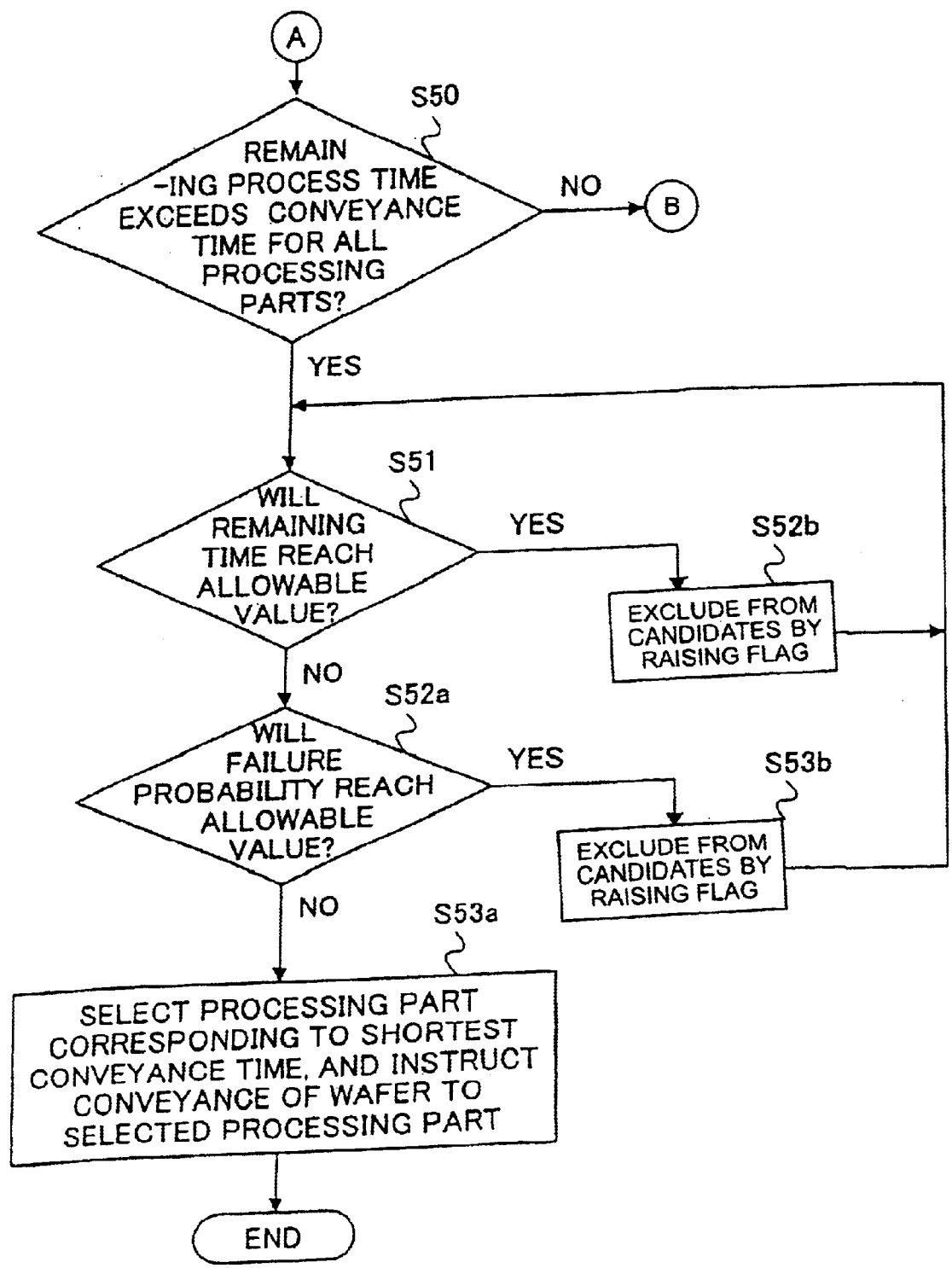
FIG. 6 is a second part of the flowchart of the operation of the production control system shown in FIG. 4.

On the other band, if it is judged, in step S42, that all the processing parts contained in the group selected in step S42 are performing a process, the routine proceeds to step S50 shown in FIG. 6. In step S50, the first control part 3 accesses the second control part 7 and refers to a "remaining time" for each processing part contained in the selected group, and judges whether or not the "remaining time" exceeds the conveyance time of the processing part for all the processing parts contained in the selected group. Then, if it is judged that the "remaining time" exceeds the conveyance time, the routine proceeds to step S51. On the other hand, if it is judged that the "remaining time" does not exceed the conveyance time, the routine proceeds to a part B shown in FIG. 6. A process of the part B will be described later.

In step S51, the first control part 3 accesses the second control part 7 and refers to the "time to the next scheduled inspection" for each processing part contained in the selected group, and judges whether or not the "time to the next scheduled inspection" will reach a predetermined allowable value when the new wafer is supplied. It should be noted that the judgment whether or not the "time to the next scheduled inspection" will reach the allowable value may be made at a time when the process applied to the newly supplied wafer is ended.

Then, with respect to the processing parts of which "time to the next scheduled inspection" is judged to reach the allowable value, the routine proceeds to step S52b. On the other hand, the routine proceeds to step S52a with respect to the processing parts of which "time to the next scheduled inspection" is judged not to reach the allowable value. In step S52b, a flag contained in the first control part 3 or the second control part 7 is raised so as to exclude the processing part from the candidates for selection, and the routine returns to step S51.

On the other hand, in step S52a, the first control part 3 accesses the second control part 7 and refers to the "failure probability" for each processing part contained in the selected group, and judges whether or not the "failure probability" will reach an allowable value. It should be noted that the judgment whether or not the "failure probability" will reach the allowable value may be made at a time when the process applied to the newly supplied wafer is ended.

Then, with respect to the processing parts of which "failure probability" is judged to reach the allowable value, the routine proceeds to step S53b. On the other hand, the routine proceeds to step S53a with respect to the processing parts of which "failure probability" is judged not to reach the allowable value. In step S53b, a flag contained in the first control part 3 or the second control part 7 is raised so as to exclude the processing part from the candidates for selection, and the routine returns to step S51.

In step S53a, the first control part 3 selects one of the processing parts, which are the candidates for selection, having a shortest conveyance time, and sends an instruction to the driver 21 and the second control part 7 to convey the wafer to the selected one of the processing parts and process the wafer in the selected one of the processing parts.

Figure 7:
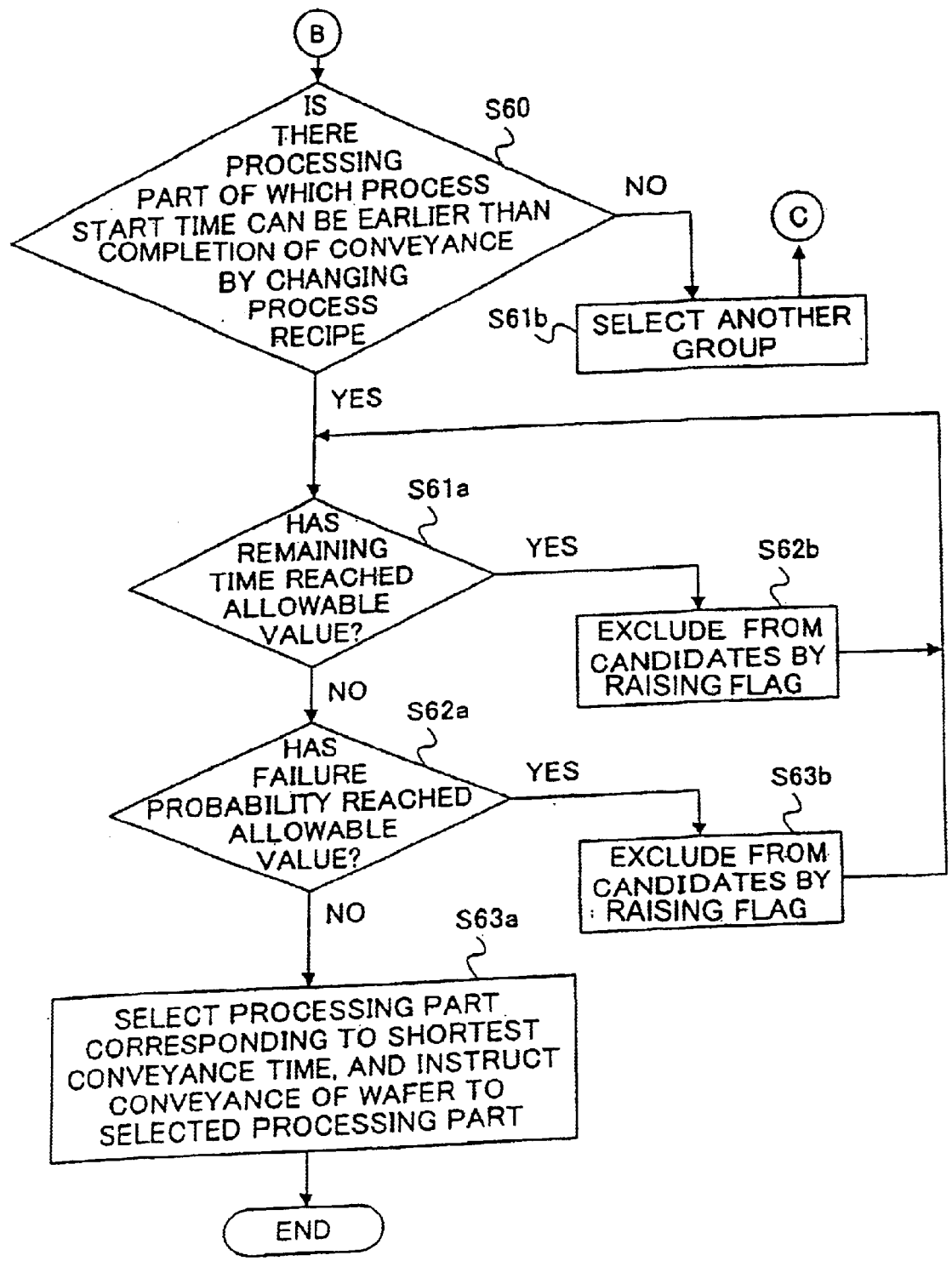
FIG. 7 is a third part of the flowchart of the operation of the production control system shown in FIG. 4.

On the other hand, if it is judged, in step S50, that the "remaining time" of at least one of the processing parts contained in the selected group is judged to be less than the conveyance time to the processing part, the routine proceeds to step S60 shown in FIG. 7. In step S60, the first control part 3 performs the above-mentioned simulation so as to judge whether or not a time when the process is started by changing a process recipe is earlier than a time when the conveyance is completed with respect to the processing parts of which process is completed prior to the conveyance of the wafer. Then, if it is judged that such a processing part is not present, the routine proceeds to step S61b so as to select another group by the first control part 3, and the routine returns to step S42.

On the other hand, if it is judged that there is a processing part of which time when the process can be started by changing a process recipe is earlier than a time when the conveyance is completed, the routine proceeds to step S61a. In step S61a, the first control part 3 accesses the second control part 7 and refers to the "time to the next scheduled inspection" for each processing part contained in the selected group, and judges whether or not the "time to the next scheduled inspection" will reach a predetermined allowable value when the new wafer is supplied. It should be noted that the judgment whether or not the "time to the next scheduled inspection" will reach the allowable value may be made at a time when the process applied to the newly supplied wafer is ended.

Then, with respect to the processing part of which "time to the next scheduled inspection" is judged to reach the allowable value, the routine proceeds to step S62b. On the other hand, the routine proceeds to step S62a with respect to the processing part of which "time to the next scheduled inspection" is judged not to reach the allowable value. In step S62b, a flag contained in the first control part 3 or the second control part 7 is raised so as to exclude the processing part from the candidates for selection, and the routine returns to step S61a.

On the other hand, in step S62a, the first control part 3 accesses the second control part 7 and refers to the "failure probability" for the processing part, and judges whether or not the "failure probability" will reach a predetermined allowable value when the new wafer is supplied. It should be noted that the judgment whether or not the "failure probability" will reach the allowable value may be made at a time when the process applied to the newly supplied wafer is ended.

Then, with respect to the processing part of which "failure probability" is judged to reach the allowable value, the routine proceeds to step S63b. On the other hand, the routine proceeds to step S63a with respect to the processing part of which "failure probability" is judged not to reach the allowable value. In step S63b, a flag contained in the first control part 3 or the second control part 7 is raised so as to exclude the processing part from the candidates for selection, and the routine returns to step S61a.

In step S63a, the first control part 3 selects one of the processing parts having a shortest conveyance time, and sends an instruction to the driver 21 and the second control part 7 to convey the wafer to the selected one of the processing parts and process the wafer in the selected one of the processing parts.

As mentioned above, an efficient manufacture of a semiconductor integrated circuit is realizable by efficiently controlling a plurality of semiconductor integrated circuit manufacturing systems by the production control controller 30 shown in FIG. 4. It should be noted that if the wafer is conveyed between the plurality of semiconductor integrated circuit manufacturing systems in the production management system shown in FIG. 4, a plurality of processes can be efficiently performed in different semiconductor integrated circuit manufacturing systems.

Figure 8:
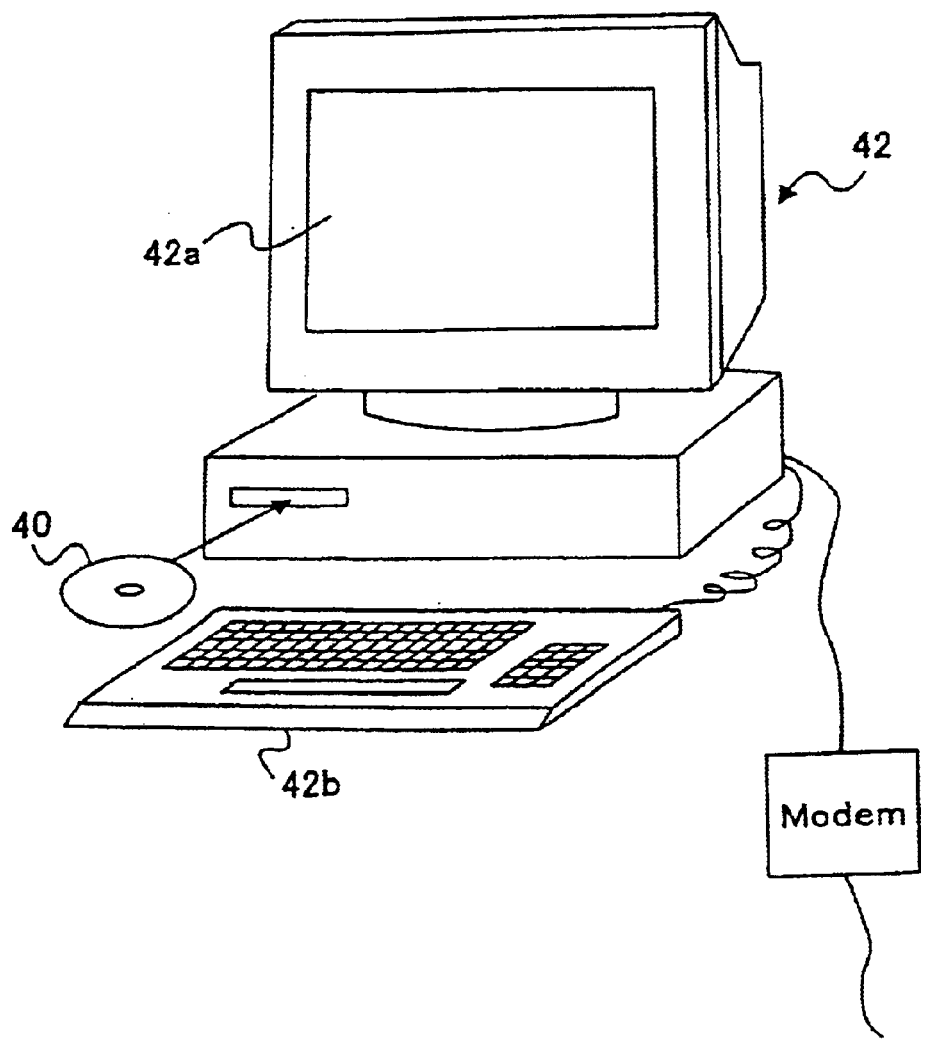
FIG. 8 is an illustration of a computer constituting a part of the semiconductor integrated circuit manufacturing shown in FIG. 1 or the production control system shown in FIG. 4.

Additionally, the above-mentioned operation of the semiconductor integrated circuit manufacturing system or the production management system including a plurality of semiconductor integrated circuit manufacturing systems can be described by programs stored in a computer-readable recording medium such as a floppy disk (FD), a CD-ROM or a DVD-ROM. That is, as shown in FIG. 8, the recording medium such as, for example, a CD-ROM 40 is attached to a computer 42 which constitutes the process control unit 10 shown in FIG. 1 or the production management controller 30 shown in FIG. 4 so that the computer executes the programs recorded on the recording medium so as to perform the above-mentioned operations. The computer may be provided with a display 42a, which displays information presented to the user, and a keyboard device 42b, which corresponds to the input part 1 shown in FIG. 1.

The present invention is not limited to the specifically disclosed embodiments, and variations and modifications may be made without departing from the scope of the present invention.

What is claimed is:

1. A semiconductor manufacturing system having a processing apparatus for applying a process to a plurality of semiconductor substrates, comprising:
    a memory part that stores priority-level data which indicates a priority level of a process to be applied to each of said plurality of semiconductor substrates on an individual semiconductor substrate basis; and
    a control part which controls said processing apparatus to process a newly supplied semiconductor substrate by determining an order of processing said plurality of semiconductor substrates being supplied to said processing apparatus based on a comparison of new priority-level data given to said newly supplied semiconductor substrate with said priority-level data stored in said memory part with respect to said plurality of semiconductor substrates so as to change a previously determined order of processing said plurality of semiconductor substrates in accordance with said new priority-level data.

2. The semiconductor manufacturing system as claimed in claim 1,
    wherein said control part calculates a time of ending a process being applied to said newly supplied semiconductor substrate to which said new priority-level data is given or a process for all of said plurality of semiconductor substrates.

3. The semiconductor manufacturing system as claimed in claim 1,
    wherein said control part calculates, based on a simulation of an operation of said processing apparatus, a time of supplying said newly supplied semiconductor substrate to which said new priority-level data is given to said processing apparatus in response to a time of ending a process designated by a user so as to end a process applied to said newly supplied semiconductor substrate to which said new priority-level data is given or all of said plurality of semiconductor substrates.

4. The semiconductor manufacturing system as claimed in claim 1,
    wherein a plurality of processing apparatuses including said processing apparatus are provided and are controlled by said control part;
    wherein a monitoring part monitors a condition of a process being performed by each of said plurality of processing apparatuses; and
    wherein said control part selects one of said plurality of processing apparatuses which applies a process to said newly supplied semiconductor substrate to which said new priority-level data is given in response to said condition of this process being performed by each of said plurality of processing apparatuses.

5. The semiconductor manufacturing system as claimed in claim 4,
    wherein said control part calculates a time of ending the process being applied to said newly supplied semiconductor substrate to which said new priority-level data is given or the process for all of the semiconductor substrates.

6. The semiconductor manufacturing system as claimed in claim 4,
    wherein said control part calculates, based on a simulation of an operation of one of said plurality of processing apparatuses, a time of supplying said newly supplied semiconductor substrate to which said new priority-level data is given to said processing apparatus in response to a time of ending a process designated by a user so as to end the process applied to said newly supplied semiconductor substrate to which said new priority-level data is given or all of said plurality of semiconductor substrates.

7. The semiconductor manufacturing system as claimed in claim 4,
    wherein said monitoring part monitors a remaining time for each of said plurality of processing apparatuses, said remaining time being a time until a process currently being applied is ended; and
    wherein said control part selects one of said plurality of processing apparatuses which applies the process to said newly supplied semiconductor substrate to which said new priority-level data is given in accordance with said remaining time.

8. The semiconductor manufacturing system as claimed in claim 4,
    wherein said monitoring part monitors a time remaining for performing a next periodic inspection for each of said plurality of processing apparatuses; and
    wherein said control part selects one of said plurality of processing apparatuses which applies the process to said newly supplied semiconductor substrate to which said new priority-level data is given in accordance with said time remaining for performing said next periodic inspection.

9. The semiconductor manufacturing system as claimed in claim 1, wherein said newly supplied semiconductor substrate is one of said plurality of semiconductor substrates of which order of processing has been scheduled so that a previously scheduled order of processing is changed in accordance with said new priority-level data.

10. The semiconductor manufacturing system as claimed in claim 1, wherein said newly supplied semiconductor substrate is a semiconductor substrate other than said plurality of semiconductor substrates of which order of processing has been scheduled so that a previously scheduled order of processing is changed in accordance with said new priority-level data.

11. A control method of a semiconductor manufacturing system having a processing apparatus which applies a process to a plurality of semiconductor substrates, comprising:
  storing priority-level data in a memory part which indicates a priority level of the process to be applied to each of said plurality of semiconductor substrates on an individual semiconductor substrate basis;
  determining an order of processing a newly supplied semiconductor substrate being supplied to said processing apparatus based on a comparison of new priority-level data given to said newly supplied semiconductor substrate with said priority-level data stored in said memory part with respect to said plurality of semiconductor substrates so as to change a previously determined order of processing said plurality of semiconductor substrates in accordance with said new priority-level data; and
  causing said processing apparatus to apply the process to said newly supplied semiconductor substrate.

12. A control method of a semiconductor manufacturing system having a plurality of processing apparatuses which apply a plurality of processes to semiconductor substrates, comprising:
  storing priority-level data in a memory part, which indicates a priority level of a process to be applied to each of said semiconductor substrates on an individual semiconductor substrate basis;
  monitoring a condition of a process in each of said processing apparatuses;
  determining an order of processing a newly supplied semiconductor substrate being supplied to one of said processing apparatuses based on a comparison of new priority-level data given to said newly supplied semiconductor substrate with said priority-level data stored in said memory part with respect to said semiconductor substrates so as to change a previously determined order of processing said semiconductor substrates in accordance with said new priority-level data;
  selecting one of said processing apparatuses which applies the process to said newly supplied semiconductor substrate in accordance with said condition of the process and said order of processing; and
  causing said processing apparatus to apply the process to said newly supplied semiconductor substrate.

13. A computer-readable recording medium storing program code for causing a computer to control a process applied to a plurality of semiconductor substrates, comprising:
  first program code means for storing priority-level data which indicates a priority level of a process to be applied to each of said plurality of semiconductor substrates on an individual semiconductor substrate basis;
  second program code means for comparing new priority-level data with said stored priority-level data with respect to said plurality of semiconductor substrates of which process has been scheduled, said new priority-level data being supplied in response to a newly supplied semiconductor substrate being supplied to a processing apparatus;
  third program code means for determining an order of processing said newly supplied semiconductor substrate being supplied to said processing apparatus while changing a previously determined order of processing said plurality of semiconductor substrates; and
  fourth program code means for causing said processing apparatus to apply the process to said newly supplied semiconductor substrate.

14. The computer-readable recording medium as claimed in claim 13, further comprising:
  fifth program code means for calculating a time of ending the process being applied to said newly supplied semiconductor substrate or a process for all of said plurality of semiconductor substrates.

15. The computer-readable recording medium as claimed in claim 13, further comprising:
  fifth program code means for calculating, based on a simulation of an operation of said processing apparatus, a time of supplying said newly supplied semiconductor substrate to said processing apparatus in response to a time of ending a process designated by a user so as to end the process applied to said newly supplied semiconductor substrate or all of said plurality of semiconductor substrates.

16. A computer-readable recording medium storing program code for causing a computer to control a process applied to a plurality of semiconductor substrates by a plurality of processing apparatuses, comprising:
  first program code means for storing priority-level data which indicates a priority level of a process to be applied to each of said plurality of semiconductor substrates on an individual semiconductor substrate basis;
  second program code means for monitoring a condition of a process in each of said plurality of processing apparatuses;
  third program code means for comparing new priority-level data with said stored priority-level data with respect to said plurality of semiconductor substrates of which process has been scheduled, new priority-level data being supplied in response to a newly supplied semiconductor substrate to which a process is applied;
  fourth program code means for determining an order of processing said newly supplied semiconductor substrate being supplied to one of said plurality of processing apparatuses;
  filth program code means for selecting said one of said plurality of processing apparatuses which applies a process to said newly supplied semiconductor substrate in accordance with said condition of the process; and
  sixth program code means for causing said selected one of said processing apparatuses to apply the process to said newly supplied semiconductor substrate;
  wherein the program code changes a previously determined order of processing semiconductor substrates in accordance with said new priority level data.

17. The computer-readable recording medium as claimed in claim 16, further comprising:
  seventh program code means for calculating a time of ending the process being applied to said newly supplied semiconductor substrate or a process for all of said plurality of semiconductor substrates.

18. The computer-readable recording medium as claimed in claim 16, further comprising:

seventh program code means for calculating, based on a simulation of an operation of one of said plurality of processing apparatuses, a time of supplying said newly supplied semiconductor substrate to said one of said plurality of processing apparatuses in response to a time of ending a process designated by a user so as to end the process applied to said newly supplied semiconductor substrate or all of said plurality of semiconductor substrates.

19. The computer-readable recording medium as claimed in claim 16, further comprising:

seventh program code means for monitoring a remaining time for each of said plurality of processing apparatuses, said remaining time being a time until the process currently being applied is ended; and eighth program code means for selecting one of said plurality of processing apparatuses which applies the process to said newly supplied semiconductor substrate in accordance with said remaining time.

20. The computer-readable recording medium as claimed in claim 16, further comprising:

seventh program code means for causing monitoring a time remaining for performing a next periodic inspection for each of said plurality of processing apparatuses; and eighth program code means for selecting said one of said plurality of processing apparatuses which applies the process to said newly supplied semiconductor substrate in accordance with said time remaining for performing said next periodic inspection.

21. A semiconductor manufacturing system having a processing apparatus for applying a process to semiconductor substrates;

wherein a memory part stores priority-level data which indicates a priority level of a process to be applied to each of said semiconductor substrates on an individual semiconductor substrate basis;

wherein a control part controls said processing apparatus to apply a process to a newly supplied one of said semiconductor substrates by determining an order of processing said newly supplied one of said semiconductor substrates being supplied to said processing apparatus based on a comparison of new priority-level data with said priority-level data stored in said memory part with respect to said semiconductor substrates of which process has been scheduled, said new priority-level data being supplied in response to said newly supplied one of said semiconductor substrates being supplied to said processing apparatus;

wherein said control part calculates a time of ending a process being applied to said newly supplied one of said semiconductor substrates or a time of ending a process for all of said semiconductor substrates; and wherein said memory part stores information regarding kinds of failure possibly occurring in said processing apparatus and a repair time needed for repairing said processing apparatus in response to each kind of failure; and when a failure occurs in processing apparatuses, said control part calculates a time of ending a process in accordance with said repair time read from said memory part in response to a kind of failure designated by a user.

22. A semiconductor manufacturing system having a processing apparatus for applying a process to semiconductor substrates;

wherein a memory part stores priority-level data which indicates a priority level of a process to be applied to each of said semiconductor substrates on an individual semiconductor substrate basis;

wherein a control part controls said processing apparatus to apply a process to a newly supplied one of said semiconductor substrates by determining an order of processing said newly supplied one of said semiconductor substrates being supplied to said processing apparatus based on a comparison of new priority-level data with said priority-level data stored in said memory part with respect to said semiconductor substrates of which process has been scheduled, said new priority-level data being supplied in response to said newly supplied one of said semiconductor substrates being supplied to said processing apparatus;

wherein a plurality of processing apparatuses are controlled by said control part;

wherein a monitoring part monitors a condition of a process being performed by each of said plurality of processing apparatuses;

wherein said control part selects one of said plurality of processing apparatuses which applies the process to said newly supplied one of said semiconductor substrates in response to a condition of the process being performed by each of said plurality of processing apparatuses;

wherein said control part calculates a time of ending the process being applied to said newly supplied one of said semiconductor substrates or a time of ending a process for all of said semiconductor substrates; and wherein said memory part stores information regarding kinds of failure possibly occurring in said processing apparatus and a repair time needed for repairing said processing apparatus in response to each of said kinds of failure; and when a failure occurs in said processing apparatus, said control part calculates a time of ending a process in accordance with said repair time read from said memory part in response to a kind of failure designated by a user.

23. A semiconductor manufacturing system having at least one processing apparatus for applying a process to semiconductor substrates;

wherein a memory part stores priority-level data which indicates a priority level of a process to be applied to each of said semiconductor substrates on an individual semiconductor substrate basis;

wherein a control part controls a processing apparatus to apply a process to a newly supplied one of said semiconductor substrates by determining an order of processing said newly supplied one of said semiconductor substrates being supplied to said processing apparatus based on a comparison of new priority-level data with said priority-level data stored in said memory part with respect to said semiconductor substrates of which process has been scheduled, said new priority-level data being supplied in response to said newly supplied one of said semiconductor substrates being supplied to said processing apparatus;

wherein a plurality of processing apparatuses are controlled by said control part;

wherein a monitoring part monitors a condition of a process being performed by each of said plurality of processing apparatuses;

wherein said control part selects one of said plurality of processing apparatuses which applies the process to said newly supplied one of said semiconductor substrates in response to said condition of the process being performed by each of said plurality of processing apparatuses; and wherein said monitoring part monitors a continuous operating time for each of said plurality of processing apparatuses; and wherein said control part selects one of said plurality of processing apparatuses which applies the process to said newly supplied one of said semiconductor substrates by referring to a failure occurring rate calculated for each of said plurality of processing apparatuses in accordance with said continuous operating time.

24. A computer-readable recording medium storing program code for causing a computer to control a process applied to semiconductor substrates, comprising:

first program code means for storing priority-level data which indicates a priority level of a process to be applied to each of said semiconductor substrates on an individual semiconductor substrate basis;

second program code means for comparing new priority-level data with previous stored priority-level data with respect to said semiconductor substrates of which process has been scheduled, said new priority-level data being supplied in response to a newly supplied one of said semiconductor substrates being supplied to a processing apparatus;

third program code means for determining an order of processing said newly supplied one of said semiconductor substrates being supplied to said processing apparatus;

fourth program code means for causing said processing apparatus to apply a process to said newly supplied one of said semiconductor substrates;

fifth program code means for calculating a time of ending the process being applied to said newly supplied one of said semiconductor substrates or a time of ending a process for all of said semiconductor substrates; and sixth program code means for storing information regarding kinds of failure possibly occurring in said processing apparatus and a repair time needed for repairing said processing apparatus in response to each of said kinds of failure; and seventh program code means, when a failure occurs in said processing apparatus, for calculating a time of ending a process in accordance with said repair time which is read in response to a kind of failure designated by a user.

25. A computer-readable recording medium storing program code for causing a computer to control a process applied to semiconductor substrates by a plurality of processing apparatuses, comprising:

first program code means for storing priority-level data which indicates a priority level of a process to be applied to each of said semiconductor substrates on an individual semiconductor substrate basis;

second program code means for monitoring a condition of a process in each of said plurality of processing apparatuses;

third program code means for comparing new priority-level data with a previously stored priority-level data with respect to said semiconductor substrates of which process has been scheduled, said new priority-level data being supplied in response to a newly supplied one of said semiconductor substrates to which a process is applied;

fourth program code means for determining an order of processing said newly supplied one of said semiconductor substrates being supplied to said plurality of processing apparatuses;

fifth program code means for selecting one of said plurality of processing apparatuses which applies a process to said newly supplied one of said semiconductor substrates in accordance with said condition of the process;

sixth program code means for causing said selected one of said plurality of processing apparatuses to apply the process to said newly supplied one of said semiconductor substrates;

seventh program code means for calculating a time of ending the process being applied to said newly supplied one of said semiconductor substrates or a time of ending a process for all of said semiconductor substrates;

eighth program code means for storing information regarding kinds of failure possibly occurring in a processing apparatus and a repair time needed for repairing said processing apparatus in response to each of said kinds of failure; and ninth program code means, when a failure occurs in said processing apparatus, for calculating a time of ending a process in accordance with said repair time which is read in response to a kind of failure designated by a user.

26. A computer-readable recording medium storing program code for causing a computer to control a process applied to semiconductor substrates by a plurality of processing apparatuses, comprising:

first program code means for storing priority-level data which indicates a priority level of a process to be applied to each of said semiconductor substrates on an individual semiconductor substrate basis;

second program code means for monitoring a condition of a process in each of said plurality of processing apparatuses;

third program code means for comparing new priority-level data with a previously stored priority-level data with respect to said semiconductor substrates of which process has been scheduled, said new priority-level data being supplied in response to a newly supplied one of said semiconductor substrates to which a process is applied;

fourth program code means for determining an order of processing said newly supplied one of said semiconductor substrates being supplied to said plurality of processing apparatuses;

fifth program code means for selecting one of said plurality of processing apparatuses which applies a process to said newly supplied one of said semiconductor substrates in accordance with said condition of the process;

sixth program code means for causing said selected one of said plurality of processing apparatuses to apply the process to said newly supplied one of said semiconductor substrates;

seventh program code means for monitoring a continuous operating time for each of said plurality of processing apparatuses; and eighth program code means for selecting one of said plurality of processing apparatuses which applies the process to said newly supplied one of said semiconductor substrates by referring to a failure occurring rate calculated for each of said plurality of processing apparatuses in accordance with said continuous operating time.

* * * * *